United States Patent [19]

Haver

[11] 4,071,455
[45] Jan. 31, 1978

[54] FILTER ELEMENT AND METHOD OF MAKING THE SAME

[75] Inventor: Eitel Fritz Haver, Oelde, Germany

[73] Assignee: Haver & Boecker, Oelde, Germany

[21] Appl. No.: 711,875

[22] Filed: Aug. 5, 1976

[30] Foreign Application Priority Data

Sept. 17, 1975 Germany .............................. 2541383

[51] Int. Cl.² ............................................. B01D 29/20
[52] U.S. Cl. .................................................. 210/497.1
[58] Field of Search ............................ 210/497, 497.1; 75/208 A, 222

[56] References Cited

U.S. PATENT DOCUMENTS

| 2,067,439 | 1/1937 | Dooley | 210/497 X |
| 3,437,457 | 4/1969 | Fisher | 75/208 A X |
| 3,442,391 | 5/1969 | Bozek | 210/497 X |
| 3,779,386 | 12/1973 | Ryan | 210/497 X |

Primary Examiner—William A. Cuchlinski, Jr.
Attorney, Agent, or Firm—Michael J. Striker

[57] ABSTRACT

One or more strips or sheets of wire cloth, or one or more perforate metallic sheets, are wound into the form of a multilayered hollow filter body. In the event that plural strips or sheets of wire cloth, or plural perforate metallic sheets, are used to form the hollow filter body, the various strips or sheets of wire cloth, or the various metallic sheets, may be of different mesh so as to obtain variations in the filtering effect. The thus-formed hollow filter body is subjected to a sintering operation so as to cause adherence of the windings of the hollow filter body to one another and thereby obtain a coherent filter body. The latter may be used as a filter element as is or may be subdivided so as to form several filter elements therefrom. It is further possible to sever the wall of the filter body along a direction paralleling the longitudinal axis of the filter body and to then straighten the severed filter body so as to obtain a multilayered filter plate. Where necessary or desirable, it is possible to provide a reinforcing element for the filter body and this reinforcing element may be arranged exteriorly of the filter body, interiorly of the filter body or in the wall of the latter. The reinforcing element may be in the form of a wire coth or a perforate metallic plate having a coarse mesh size.

31 Claims, 10 Drawing Figures

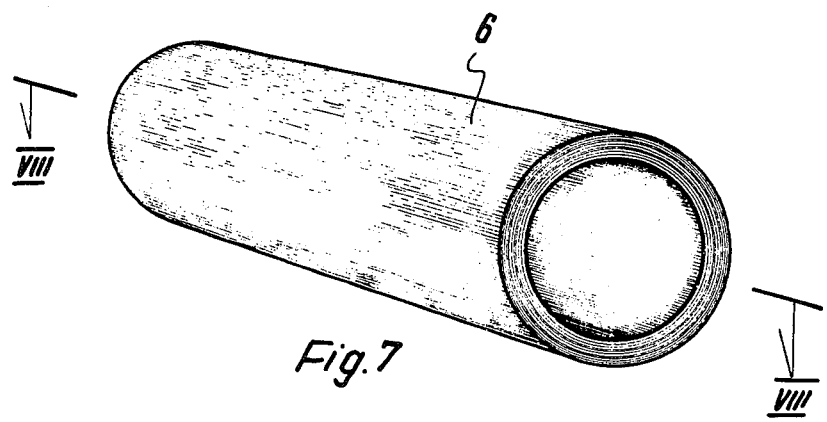
Fig.7
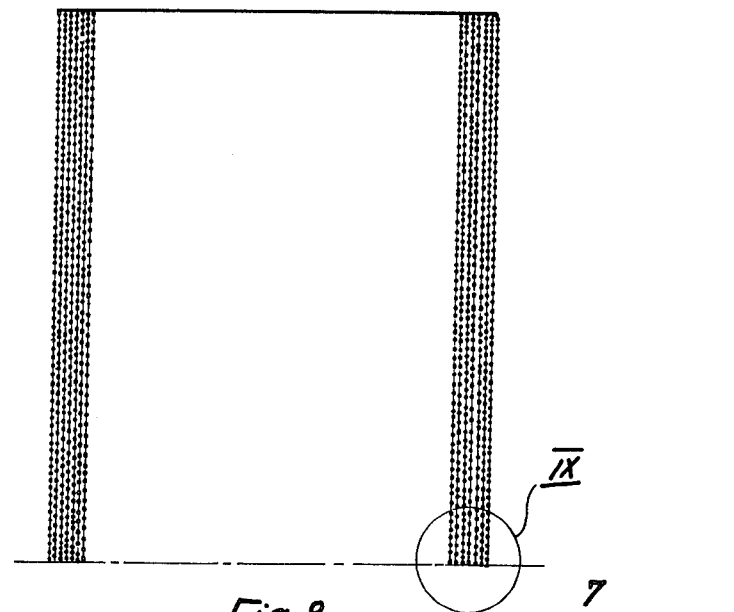
Fig.8
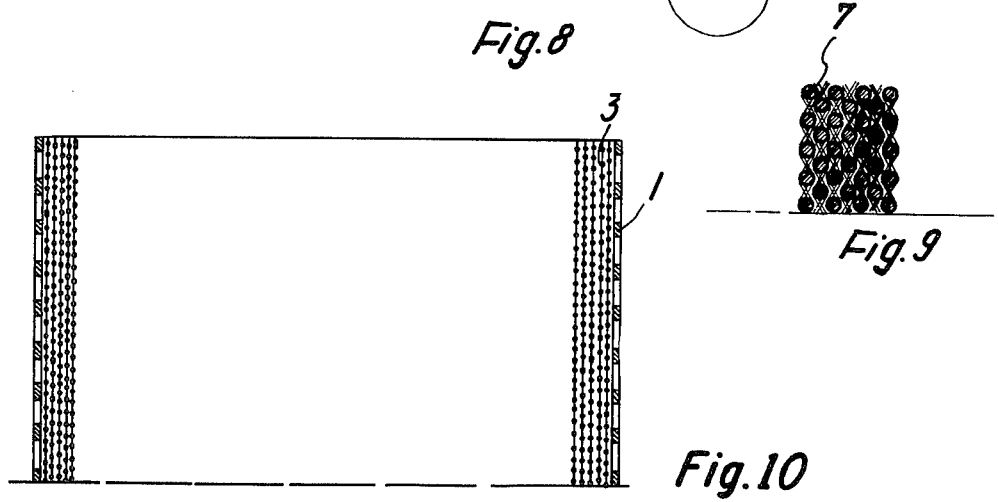
Fig.9
Fig.10

FILTER ELEMENT AND METHOD OF MAKING THE SAME

BACKGROUND OF THE INVENTION

The invention relates to filter elements, especially hollow filter elements, for the filtration of gaseous or liquid media as well as to a method of making such filter elements.

Filter cartridges constructed in the form of cylindrical hollow bodies are known. In order to be used, such filter cartridges are threaded into a support so as to have a vertical orientation. These known filter cartridges are distinguished in that they have a large surface area available for filtration.

The filter cartridges may be economically manufactured from metal powder using a sintering operation. Since the sintered metal has an inhomogeneous structure, however, the individual filter cartridges cannot provide an uniform filtering effect.

It is further known to arrange a plurality of wire cloths of different mesh one upon the other and to join the individual layers by sintering so as to form a filter plate. The filter plate is bent to the form of a cylindrical body and the abutting edges of the filter plate are then welded to one another. The hollow filter body obtained in this manner thus has a weld seam which extends along the entire length of the filter body. The filtering effect in the region of this weld seam is non-existent. In addition to this disadvantage, there exists the consideration that the production costs for a filter body of this type are very high.

SUMMARY OF THE INVENTION

It is an object of the invention to provide a method for the production of filter elements, especially hollow filter elements, which makes it possible, at low cost, to manufacture a filter element capable of providing an uniform filtering effect, which is reproducible in the manufacture of additional filter elements, over substantially the entire surface area thereof.

It is also an object of the invention to provide a filter element, especially a hollow filter element, which is of low cost but is nevertheless capable of providing an uniform filtering effect over substantially the entire surface area thereof.

These objects, as well as others which will become apparent as the description proceeds, are achieved in accordance with the invention. According to one aspect of the invention, there is provided a method of making filter elements wherein material which is capable of being sintered and which has a mesh size suitable for the filtration of fluid substances is shaped into the form of windings so as to obtain a multilayered hollow filter body. The latter is sintered so as to cause adherence of the windings to one another.

According to another aspect of the invention, there is provided a filter element comprising a multilayered hollow filter body which is at least in part constituted by windings which are sintered to one another and which have a mesh size suitable for the filtration of fluid substances. The filter element further includes at least one reinforcing element for the hollow body having a mesh size at least as large as that of the windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 7 is a perspective view of a further embodiment of a hollow filter element according to the invention;

FIG. 8 is a section along the line VIII—VIII of FIG. 7; and

FIG. 9 is an enlarged view of the location IX of FIG. 9; and FIG. 10 is an axial section of a further embodyment of a hollow filter element according to the invention.

DESCRIPTION OF THE PREFERRED EMBODIMENTS

Figure 1:
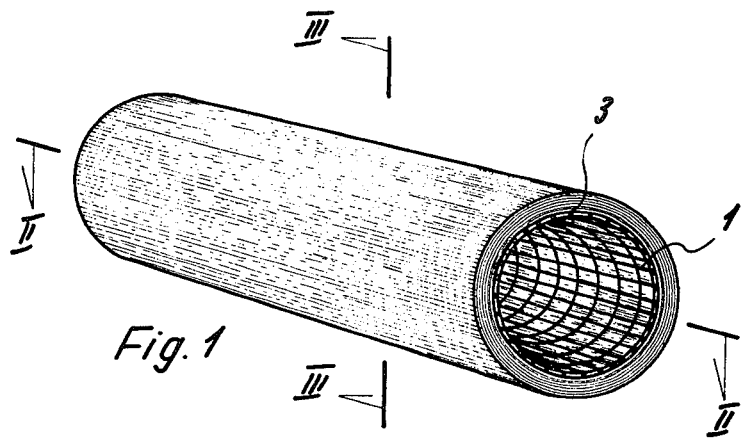
FIG. 1 is a perspective view of one embodiment of a hollow cylindrical filter element according to the invention.

In accordance with the method aspect of the invention, the objects of the invention are achieved with a method of producing filter elements for gaseous or liquid media wherein a hollow filter body is formed by winding a strip of wire cloth, a sheet of wire cloth or an apertured metallic plate into a multilayer configuration, or by winding a plurality of strips of wire cloth having various mesh sizes or filter openings, a plurality of sheets of wire cloth having various mesh sizes or filter openings, or a plurality of apertured metallic sheets having various mesh sizes or filter openings into a multilayered configuration. The thus-formed hollow filter body is subsequently sintered.

The sintering operation will generally be performed at temperatures below the melting points of the materials which are used and will thus generally involve solid state diffusion.

Since the filter body is prepared by winding, it is possible to produce hollow filter bodies of different cross-sectional size and configuration in a simple manner. The hollow filter body may have a circular, an oval or a polygonal cross-sectional configuration. Furthermore, the outline of the cross-section of the hollow filter body may have a regular or an irregular profile. Thus, for example, the outline of the cross-section of the hollow filter body may have a star-shaped or wave-shaped contour. The method according to the invention makes it possible to prepare economical filter elements having the most diverse configurations and dimensions.

The method according to the invention does not result in a weld seam which adversely influences the filtering effect. The seamless constructions of the hollow filter element makes it possible to achieve an uniform filtering effect over the entire surface area thereof.

Since one or more types of wire cloths or perforate metallic plates may be used in the production of a filter element, the filtering effect for the individual filter elements may be varied, fixed and reproduced in the simplest manner.

The storage of the filter elements may be simplified by manufacturing hollow filter bodies of great length and then cutting off sections of these filter bodies in accordance with the requirements of a customer thereby yielding filter elements meeting the customer's specifications.

The hollow filter elements may be reinforced and this may be achieved by providing the hollow filter elements with reinforcing members. The reinforcing members which may be used when a filter element is to be reinforced include wire cloths, metallic plates provided with perforations, helical springs or the like. The reinforcing members preferably have a mesh size which is at least as large as that of the respective filter element and, advantageously, the mesh size of the reinforcing members is larger than that of the respective filter element.

The reinforcing member for a filter element may be provided at the entrance side of the filter element, that is, the side at which the medium to be filtered enters the filter element. However, it is also possible to have constructions wherein the reinforcing member is provided in the middle region of the filter element, that is, in the wall of the filter element, or constructions wherein the reinforcing member is arranged at the side of the filter element opposite the entrance side, that is, the exit side of the filter element where the medium being filtered leaves the filter element. In short, it is possible to arrange the reinforcing member exteriorly of the filter element, interiorly of the filter element or in the wall of the latter.

The method of the invention also affords the possibility of cutting through the wall of the sintered, hollow filter element along a line which extends parallel to the longitudinal axis of the filter element, that is, along a generatrix of the filter element, and then forming, e.g., straightening, the hollow filter element so as to produce a multilayered filter plate.

Figure 2:
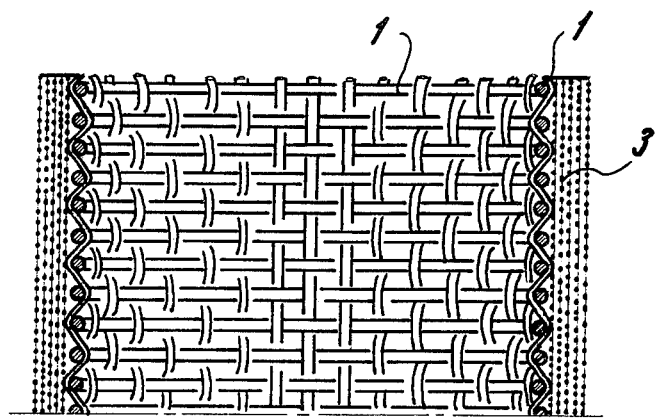
FIG. 2 is a section along the line II—II of FIG. 1.
Figure 3:
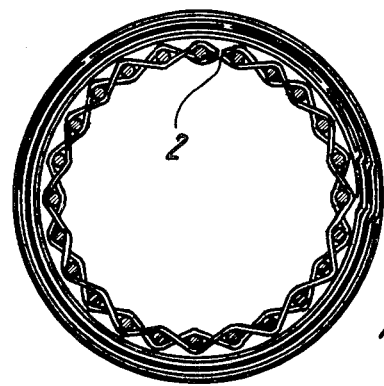
FIG. 3 is a section along the line III—III of FIG. 1.

Referring now to the embodiment of FIGS. 1-3 of the drawings, it may be seen that the hollow filter element illustrated is provided with a reinforcing wire cloth 1 interiorly thereof. The wire cloth 1 is formed into the shape of a ring or an annulus and the free ends of the wire cloth 1 are practically flush with one another and define a gap 2 as best seen from FIG. 3. Several layers of wire cloth 3 are wound upon the reinforcing wire cloth 1. The layers of wire cloth 3 are here assumed to be formed from wire cloth in strip form and the layers may be formed from a single strip of wire cloth or from a plurality of strips of wire cloth. In the event that plural strips of wire cloth are used for the construction of the hollow filter element, it is possible to utilize wire cloth strips having various mesh sizes and thereby effect variations in the filtering effect. It may be seen that the wire cloth 1 is of coarser mesh than the layers of wire cloth 3.

As indicated earlier, the reinforcing wire cloth may also be arranged in the wall of the hollow filter element or at the outer region of the latter. Furthermore, the arrangement of the wire cloth or cloths with the fine mesh or small filter openings may be varied.

Regardless of which construction is selected for the hollow filter element, the manufacture thereof may proceed economically since, after winding of the hollow filter element, the configurational stability is achieved by means of a simple sintering operation.

Figure 4:
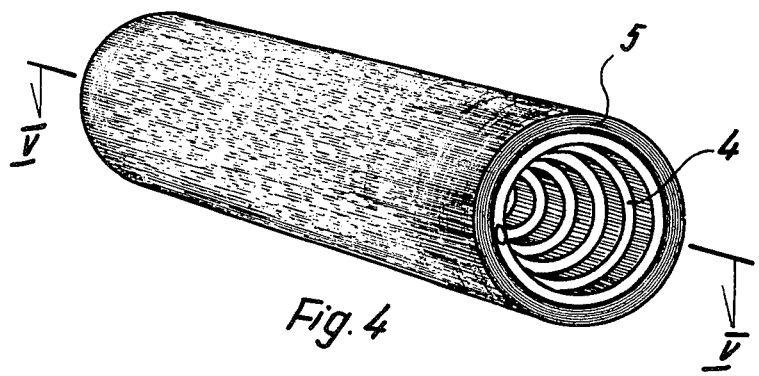
FIG. 4 is a perspective view of another embodiment of a hollow filter element according to the invention.
Figure 5:
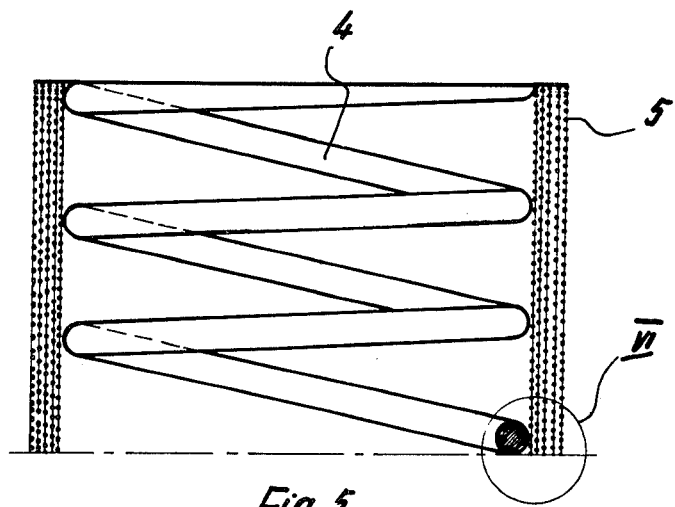
FIG. 5 is a section along the line V—V of FIG. 4.
Figure 6:
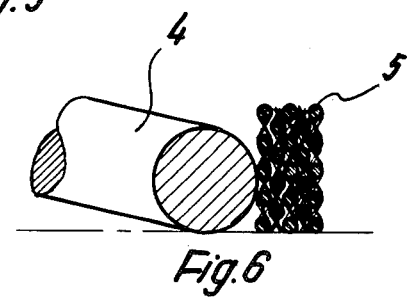
FIG. 6 is an enlarged view of the location VI of FIG. 5.

In the embodiment of FIGS. 4-6 of the drawings, the reinforcing member is in the form of a helical spring 4 which extends along the entire length of the hollow cylindrical filter element. Several layers of wire cloth 5 formed from one or more strips of wire cloth are wound upon the spring 4 and the layers of wire cloth 5 form the actual filter body.

FIGS. 7-9 of the drawings illustrate a hollow filter element 6 which is not provided with a reinforcing member. The filter element 6 is constructed of several layers of wire cloth 7 formed by the winding of one or more strips of wire cloth and is fixed in its final form by sintering.

FIG. 10 shows an embodiment in which the reinforcing member 1 is arranged exteriorly of the layers of wire cloth 3.

In the illustrated embodiments, the individual layers are wound parallel to one another. It is possible, however, to helically wind one or more strips or sheets of wire cloth to the form of a hollow body and to thereafter fix the final form by sintering.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a filter, comprising the steps of providing at least one material which is capable of being sintered and which has apertures of a predetermined size, convoluting the material to form a hollow filter body which is composed of a plurality of superimposed layers, each having a plurality of said apertures; sintering said hollow body at a temperature which is below the melting point of said material so as to bond said superimposed layers together without substantially altering the size of the apertures therein and thereby produce a filter having a predetermined uniform filtration capability over its entire filter surface area.

2. A method as defined in claim 1, said step of providing being performed with woven metal wire mesh.

3. A method as defined in claim 1, said step of convoluting comprising forming a hollow tubular filter body.

4. A method as defined in claim 1, said step of sintering being performed by seamlessly bonding said surperimposed layers.

5. A method as defined in claim 1, said step of providing being performed with woven metal wire which has apertures of uniform size and distribution, and said step of sintering being performed without substantially altering the uniform size and distribution of the apertures.

6. A method as defined in claim 1, said step of convoluting being performed by forming the hollow body from a single strip of wire cloth.

7. A method as defined in claim 1, said step of convoluting being performed by forming the hollow body from a single sheet of wire cloth.

8. A method as defined in claim 1, said step of convoluting being performed by forming the hollow body from a single foraminous metal sheet.

9. A method as defined in claim 1, said step of convoluting being performed by forming the hollow body from a plurality of strips of wire cloth, at least one of the strips having a mesh size which is different from that of another of said strips.

10. A method as defined in claim 1, said step of convoluting being performed by forming the hollow body from a plurality of sheets of wire cloth, at least one of the sheets having a mesh size which is different from that of another of said sheets.

11. A method as defined in claim 1, said step of convoluting being performed by forming the hollow body from a plurality of foraminous metal sheets, at least one of the sheets having a mesh size which is different from that of another of said sheets.

12. A method as defined in claim 1, further comprising subdividing the sintered hollow body in such a manner as to form at least two hollow filters therefrom.

13. A method as defined in claim 1, further comprising the step of severing a wall of the sintered hollow body along a direction substantially parallel to the longitudinal axis thereof, and shaping the thus-severed hollow body into the form of a plate so as to obtain a laminated filter plate.

14. A filter element, comprising a multilayered hollow filter body having a predetermined uniform filtration capacity over its entire filter surface area, said filter body comprising a plurality of convolutions of at least one material which has apertures of a predetermined size, and convolutions being sintered together without substantial alteration in the size of said apertures; and at least one reinforcing element for said filter body, said reinforcing element having apertures which are at least as large as those of said convoluted material.

15. The filter element of claim 14, wherein said reinforcing element is arranged exteriorly of said hollow body.

16. The filter element of claim 14, wherein said reinforcing element is arranged interiorly of said hollow body.

17. The filter element of claim 14, wherein said reinforcing element is arranged in the wall of said hollow body.

18. The filter element of claim 14, wherein said reinforcing element comprises wire cloth.

19. The filter element of claim 14, wherein said reinforcing element comprises a perforate metallic sheet.

20. The filter element of claim 14, wherein a plurality of reinforcing elements are present and are arranged in layers.

21. The filter element of claim 20, wherein said reinforcing elements are in the form of perforate metallic sheets.

22. The filter element of claim 14, wherein said reinforcing element comprises a helical spring.

23. The filter element of claim 14, wherein said hollow body has a substantially circular cross-section.

24. The filter element of claim 14, wherein said hollow body has a substantially oval cross-section.

25. The filter element of claim 14, wherein said hollow body has a substantially polygonal cross-section.

26. The filter element of claim 14, wherein the outline of the cross-section of said hollow body is regular.

27. The filter element of claim 14, wherein the outline of the cross-section of said hollow body is irregular.

28. The filter element of claim 14, said convolutions comprising at leat two materials, each having a different predetermined size of apertures.

29. The filter element of claim 14, said filter body having a plurality of convolutions of a single material having apertures of a predtermined size and said reinforcing element.

30. The filter element of claim 14, said plurality of convolutions being composed of a single material, each convolution being superimposed on and in direct contact with another convolution.

31. The filter element of claim 14, said plurality of convolutions comprising a single material having apertures of a predetermined uniform size and distribution.

* * * * *